(12) United States Patent
Shinohara et al.

(10) Patent No.: US 6,685,794 B2
(45) Date of Patent: Feb. 3, 2004

(54) METHOD AND APPARATUS FOR BONDING OPTICAL DISC SUBSTRATES TOGETHER, AND METHOD FOR SUPPLYING LIQUID MATERIAL

(75) Inventors: Shinichi Shinohara, Tokyo (JP); Hideo Kobayashi, Tokyo (JP); Masahiro Nakamura, Tokyo (JP); Kanya Kaji, Tokyo (JP)

(73) Assignee: Origin Electric Co., Ltd., Tokyo (JP)

( * ) Notice: Subject to any disclaimer, the term of this patent is extended or adjusted under 35 U.S.C. 154(b) by 145 days.

(21) Appl. No.: 09/778,232

(22) Filed: Feb. 6, 2001

(65) Prior Publication Data

US 2001/0035250 A1 Nov. 1, 2001

(30) Foreign Application Priority Data

Apr. 27, 2000 (JP) .................................. P2000-127061

(51) Int. Cl.⁷ .............................................. G02B 43/20
(52) U.S. Cl. ................................ 156/273.1; 156/273.5; 156/275.7
(58) Field of Search ................................ 156/74, 272.2, 156/273.1, 273.3, 275.7

(56) References Cited

U.S. PATENT DOCUMENTS

| | | | |
|---|---|---|---|
| 3,995,282 A | 11/1976 | d'Alton-Rauch et al. | |
| 4,837,045 A | 6/1989 | Nakajima | |
| 5,935,331 A | 8/1999 | Naka et al. | |
| 6,261,403 B1 * | 7/2001 | Gerigk et al. | 156/272.2 |

FOREIGN PATENT DOCUMENTS

| | | |
|---|---|---|
| DE | 197 48 699 | 5/1999 |
| DE | 19850 832 A1 | 5/2000 |
| EP | 0 253 539 | 1/1988 |
| EP | 0 919 288 | 6/1999 |
| EP | 0 957 478 | 11/1999 |
| EP | 0 999 249 A2 | 11/1999 |
| EP | 1 026 214 A2 | 1/2000 |
| EP | 0 999 249 | 5/2000 |
| EP | 1 009 018 | 6/2000 |
| EP | 1 026 214 | 8/2000 |
| JP | 61235133 | 10/1986 |
| JP | 62197176 | 8/1987 |
| JP | 01014752 | 1/1989 |
| JP | 04170731 | 6/1992 |
| JP | 05036118 | 2/1993 |
| JP | 08036791 | 2/1996 |
| JP | 11066644 | 3/1999 |
| JP | 2000-290602 | 12/2000 |

OTHER PUBLICATIONS

European Search Report, Application No. EP 01 42 0027, Jan. 10, 2003, with Communication.

* cited by examiner

Primary Examiner—Michael W. Ball
Assistant Examiner—John T. Haran
(74) Attorney, Agent, or Firm—Kolisch Hartwell, P.C.

(57) ABSTRACT

The object of the present invention is to significantly inhibit the formation of voids between substrates bonded together when a liquid adhesive is supplied onto an optical disc substrate or when the optical disc substrate is bonded to another optical disc substrate. Accordingly, the present invention discloses a method for bonding two optical disc substrates together which comprises the steps of joining the optical disc substrates together with an adhesive and curing the adhesive, wherein the adhesive is supplied onto the optical disc substrate by an electric field formed between the adhesive-supplying nozzle, for supplying the adhesive onto the optical disc substrate, and the optical disc substrate, and the two optical disc substrates are then joined together and subjected to spun by a spinning process.

24 Claims, 8 Drawing Sheets

METHOD AND APPARATUS FOR BONDING OPTICAL DISC SUBSTRATES TOGETHER, AND METHOD FOR SUPPLYING LIQUID MATERIAL

BACKGROUND OF THE INVENTION

1. Field of the Invention

The present invention relates to a method and an apparatus for forming a single optical disc substrate by bonding optical disc substrates together and a method for supplying a liquid material.

2. Description of the Related Art

When optical disc substrates are bonded together by an optical disc bonding apparatus using a liquid adhesive, it is important to ensure that no void exists in the adhesive layer after the bonding of the substrates. Therefore, various proposals have heretofore been considered, but all proposals have been unsatisfactory in that voids having a diameter of about 0.1 mm or larger, minute voids having a diameter of about 0.05 to 0.1 mm, or a mixture of these voids are formed between the optical disc substrates.

As a method for significantly minimizing such a problem, the applicant of the present invention has applied the following invention, described in Japanese Patent Application No. Hei 10-257530. The invention will be described with reference to FIG. 8. Of two optical disc substrates A and B, a ring-shaped adhesive liquid film Ta is formed on the upper bonding surface of the lower optical disc substrate A. On the bonding surface of the upper optical disc substrate B, a plurality of dot-shaped adhesive liquid films Tb are formed in a circular shape having a diameter slightly larger than that of the ring-shaped adhesive liquid film Ta. Thereafter, the two optical disc substrates A and B are brought close together with the bonding surfaces thereof facing each other, and the two optical disc substrates A and B are joined together bringing the ring-shaped adhesive liquid film Ta into contact with the dot-shaped adhesive liquid films Tb. Then, the two optical disc substrates A and B are spin-processed to spread out the adhesive liquid film Ta and the adhesive liquid films Tb. The excess adhesive is spun off from the substrates, and an adhesive layer having a uniform film thickness is formed between the optical disc substrates A and B.

In this method, by properly bringing the ends of the dot-shaped adhesive liquid films Tb, which are formed in a circular shape on the upper optical disc substrate B, into contact with the rim of the ring-shaped adhesive liquid film Ta formed on the lower optical disc substrate A, the development of particularly minute voids at the moment when these liquid films make contact with each other can be prevented. Further, since air between the liquid films is expelled when the contact portions between the liquid films expand over the entire liquid films, the occurrence of voids is lower at these points.

However, since it is still extremely difficult, even by this method, to make the contact area sufficiently small at the moment when the adhesive liquid film Ta and the adhesive liquid films Tb contact each other, the development of minute voids cannot be totally prevented. Further, voids may develop when the adhesive liquid film Ta or the adhesive liquid films Tb make contact with the opposing optical disc substrate B or A.

Further, since voids may also be formed when the adhesive liquid film Ta or the adhesive liquid films Tb are formed by supplying a liquid adhesive from an adhesive-supplying nozzle (not shown) onto the lower optical disc substrate A or onto the upper optical disc substrate B, the formation of voids during this process also needs to be prevented.

The present invention has been invented in view of the above circumstances. The object of the present invention is to provide a method and an apparatus for bonding optical disc substrates together, which rarely or never generate voids between the optical disc substrates when a liquid adhesive is supplied onto the optical disc substrate or the like, or when the two optical disc substrates or the like supplied with an adhesive are bonded together.

SUMMARY OF THE INVENTION

The present invention relates to a method for bonding two optical disc substrates together which comprises the steps of joining the optical disc substrates together with an adhesive and curing the adhesive, in which the adhesive is supplied onto the optical disc substrate by an electric field formed between an adhesive-supplying nozzle, for supplying the adhesive onto the optical disc substrate, and the optical disc substrate, and the two optical disc substrates are then joined together and spun by a spinning process.

When the adhesive is supplied onto one of the two optical disc substrates in the shape of a ring, the other optical disc substrate may not have the adhesive applied thereon at all, may have the adhesive film formed over almost the entire surface, or may have the adhesive formed into dots at a relatively small spacing in a circular shape.

When the adhesive is supplied as dots at a relatively small spacing in a circular shape on one of the two optical disc substrates, the other optical disc substrate may not have the adhesive applied thereon at all or may have the adhesive film formed over almost the entire surface.

The present invention also relates to an apparatus for bonding optical disc substrates together by joining the two optical disc substrates together with an adhesive and curing the adhesive, which comprises an adhesive-supplying nozzle for supplying the adhesive onto the optical disc substrate, an electrode means placed in contact with or in the vicinity of the surface of the optical disc substrate which is opposite the surface which faces the adhesive-supplying nozzle, and an electric power supply for generating an electric field between the electrode means and the adhesive-supplying nozzle.

The adhesive-supplying nozzle comprises a single nozzle or two nozzles separated from each other by almost 180 degrees, is placed over the optical disc substrate nearly perpendicular thereto with its tip(s) pointing downward, and forms a ring-shaped adhesive liquid film on the optical disc substrate which spins relative to the nozzle(s).

The adhesive-supplying nozzle may comprise, for example, a plurality of nozzles placed at an approximately uniform spacing in a circular shape, may be placed under the optical disc substrate nearly perpendicular thereto with their tips pointing upward, and may supply dot-shaped adhesive liquid films onto the underside of the optical disc substrate.

In this case, the electric field generated by the electric power supply may be an alternating-current or a direct-current electric field. However, the alternating-current electric field is preferable.

DETAILED DESCRIPTION OF THE PREFERRED EMBODIMENT

A description of the principle of the present invention will first be given. The present invention is based on a finding that when an electric field, especially an alternating-current electric field, is generated between an adhesive-supplying nozzle and an optical disc substrate at the time of supplying a liquid adhesive from the adhesive-supplying nozzle onto the optical disc substrate, a contact area of the liquid film of the adhesive supplied onto the optical disc substrate which makes contact with the other optical disc substrate directly or when the adhesive liquid film is formed thereon for the first time, can be smaller, and the less likely it is that voids are formed in compliance with the contact area is smaller.

It is believed that because the electric field becomes quite large immediately before the liquid film of the adhesive first makes contact, an end of the liquid film of the adhesive is tapered off, thereby making the contact area smaller.

Generally known digital versatile discs (DVD) are classified into: a single-sided single-layer optical disc in which only one of the optical disc substrates to be bonded together has a recording layer comprising pits and a reflective layer; a double-sided single-layer optical disc in which both of the optical disc substrates to be bonded together have a recording layer; a single-sided double-layer optical disc in which the reflective layer of one of the optical disc substrates to be bonded together is a translucent film; a combination of the single-sided single-layer optical disc and the single-sided double-layer optical disc described above; and a double-sided double-layer optical disc comprising two single-sided double-layer optical discs bonded together. The present invention can be applied to the production of any of these various types of DVD's.

Figure 1A:
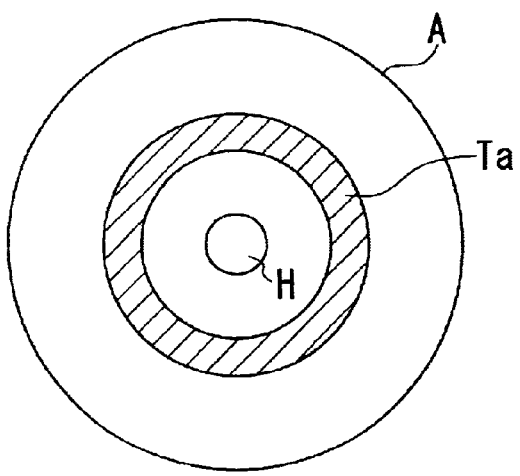
FIG. 1A is a front view of optical disc substrate which illustrates an embodiment of the method for bonding optical disc substrates of the present invention.
Figure 1C:
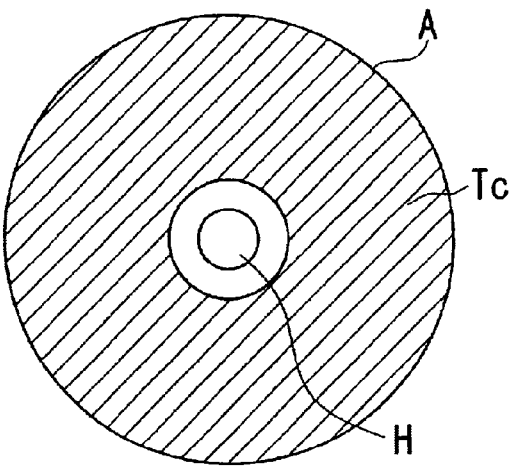
FIG. 1C is a front view of optical disc substrate which illustrates an embodiment of the method for bonding optical disc substrates of the present invention.
Figure 1B:
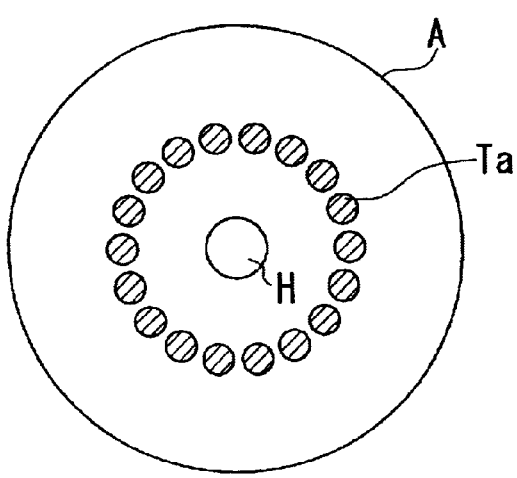
FIG. 1B is a front view of optical disc substrate which illustrates an embodiment of the method for bonding optical disc substrates of the present invention.

Before a description of the embodiments of the present invention is given to, the shapes and combinations of liquid adhesives on an optical disc substrate from which the desired effects can be expected when the present invention is applied will be described by taking an optical disc substrate having a hole in the center as an example. In FIG. 1A, on the optical disc substrate denoted by the mark A, an adhesive liquid film Ta is formed in the shape of a ring around a central hole H. In FIG. 1B, on the optical disc substrate A, dot-shaped adhesive liquid films Tb are formed into dots at a small spacing in a circular shape having a central hole H in the center. In FIG. 1C, on the optical disc substrate A, a flat adhesive liquid film Tc is formed over almost the entire surface of the substrate except for a predetermined circular area having a central hole H in the center. Further, in FIG. 1D, the optical disc substrate A has no adhesive liquid film formed thereon.

Next, combinations of the substrates A denoted in FIGS. 1A to 1D, with which the effect of the present invention can be obtained, will be described. As for the substrate A denoted in FIG. 1A, a combination with a substrate similar to the substrate A denoted in FIG. 1A or with any of the substrates A denoted in FIGS. 1B to D can obtain the desired effect of the present invention by employing the voltage-applying method according to the present invention. As for the substrate A denoted in FIG. 1B, similarly, a combination with a substrate similar to the substrate A denoted in FIG. 1B or with any of the substrates A denoted in FIGS. 1A to 1D can obtain the desired effect of the present invention by employing the voltage-applying method according to the present invention. On the other hand, a combination of the substrate A denoted in FIG. 1C and the substrate A denoted in FIG. 1D and a combination of the substrate A denoted in FIG. 1C and a substrate similar to the substrate A denoted in FIG. 1C cannot produce the desired effect of the present invention even by employing the voltage-applying method according to the present invention.

A description of the first embodiment of the present invention will be given to a with reference to the drawings.

Figure 2:
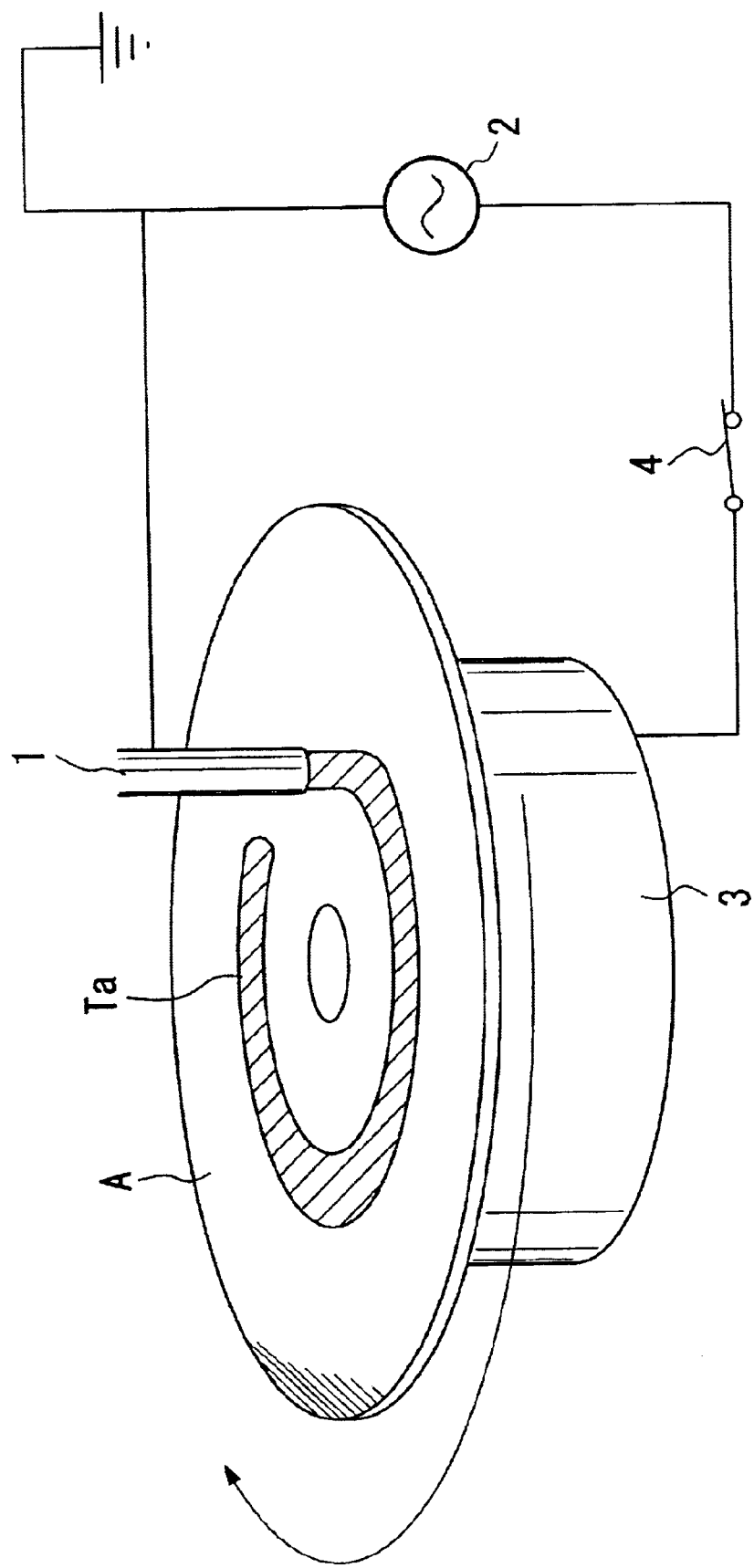
FIG. 2 is an upper perspective view which illustrates an embodiment of the method and the apparatus for bonding optical disc substrates together according to the present invention.

FIG. 2 is a diagram for illustrating an embodiment in which a ring-shaped adhesive liquid film Ta as denoted in FIG. 1A is formed. An adhesive-supplying nozzle 1 for supplying a liquid adhesive to the optical disc substrate A is a small-diameter pipe made of an ordinary metallic material, by which a general liquid-supplying operation is performed. The adhesive-supplying nozzle 1 is connected to one of the terminals of an alternating-current power supply 2 as well as to the ground potential, and an electrode means 3 which serves as an electrode on a support stage is connected, via a switch 4, to the other terminal of the alternating-current power supply 2. Therefore, when the switch 4 is ON and a sinusoidal voltage from the alternating-current power supply 2 is applied between the adhesive-supplying nozzle 1 and the electrode means 3, an alternating-current electric field is generated therebetween. By continuously supplying a predetermined amount of a liquid adhesive from the adhesive-supplying nozzle 1 onto the bonding surface of the disc substrate A while the support stage is rotated almost 360° at a fixed speed while the alternating-current electric field is generated, a ring-shaped adhesive liquid film Ta as denoted in FIG. 1A is formed. In this case, end of the liquid film of the adhesive is tapered off due to the effect of the alternating-current electric field and the contact area becomes smaller, whereby voids are less likely to be formed between the optical disc substrate A and the liquid film Ta.

The amount of the sinusoidal voltage applied cannot be generally determined because it depends on the rotation speed of the optical disc substrate A or the adhesive-supplying nozzle 1, the ejection speed of the liquid adhesive, and properties of the liquid adhesive such as resistivity and viscosity. In the embodiment, the sinusoidal voltage having a peak value of about 1 kV and a frequency of 500 Hz was used. In this case, the amount of the sinusoidal voltage applied is preferably as small as possible in order to minimize the risk of occurrence of electrical discharge but large enough to achieve the desired object. It has been found that by setting the frequency of the applied sinusoidal voltage equal to 50 Hz and above when the ring-shaped adhesive liquid film Ta as denoted in FIG. 1A is formed, the amount of the applied sinusoidal voltage can be decreased while the desired object to prevent or reduce the formation of voids is achieved. Thus, the frequency of the sinusoidal voltage applied is preferably equal to 50 Hz and above.

Next, an embodiment, in which dot-shaped adhesive liquid films Tb as denoted in FIG. 1B are formed, will be described with reference to FIG. 3. A base portion 5, which is made of a metallic material or a synthetic resin material whose surface is covered with an electrical insulating coating, has a ring-shaped peripheral wall portion 6 provided along the outermost periphery of one surface of the base portion for the purpose of storing an excess of the adhesive supplied from the adhesive-supplying nozzle 1. The adhesive-supplying nozzle 1 comprises a ring-shaped common nozzle portion 1*a* formed around the center of the base portion 5 and nozzle portions 1*b* formed at an approximately uniform spacing in the circumferential direction of the common nozzle portion 1*a,* and is made of a metal such as stainless steel. The numbers of the nozzle portions 1*b* are the same as the numbers of dots in the dot-shaped adhesive liquid films Tb as denoted in FIG. 1B for example. Further, the base portion 5 has a liquid-supplying channel 7 for supplying a liquid adhesive to the adhesive-supplying nozzle 1. At the center of the base portion 5, a support 9 is fixed which supports a center pin 8 which is inserted into the central hole H of the optical disc substrate A for positioning the optical disc substrate A.

A support means 10 supports the optical disc substrate in order to move the optical disc substrate not only vertically but also horizontally as required, and comprises a ring-shaped plate or disc-shaped electrode portion 11 and a positioning means 12 which holds the center pin 8 on the main surface thereof. This support means 10 is connected to a driving mechanism for moving the optical disc substrate vertically or in other directions. Further, although not shown, a suction path and the like, for selectively holding the optical disc substrate by suction, is formed on the underside of the electrode portion 11. The electrode portion 11 is connected, via the switch 4, to one of the terminals of the alternating-current power supply 2, and the adhesive-supplying nozzle 1 is connected not only to the ground potential but also to the other terminal of the alternating-current power supply 2. Further, the center pin 8 and the support 9 are not necessarily required, and it is also by all means acceptable to detect via a sensor (not shown) whether the support means 10 is moved horizontally to a predetermined position over the adhesive-supplying nozzle 1, in order to stop the horizontal movement and then move the support means 10 downward.

Figure 3:
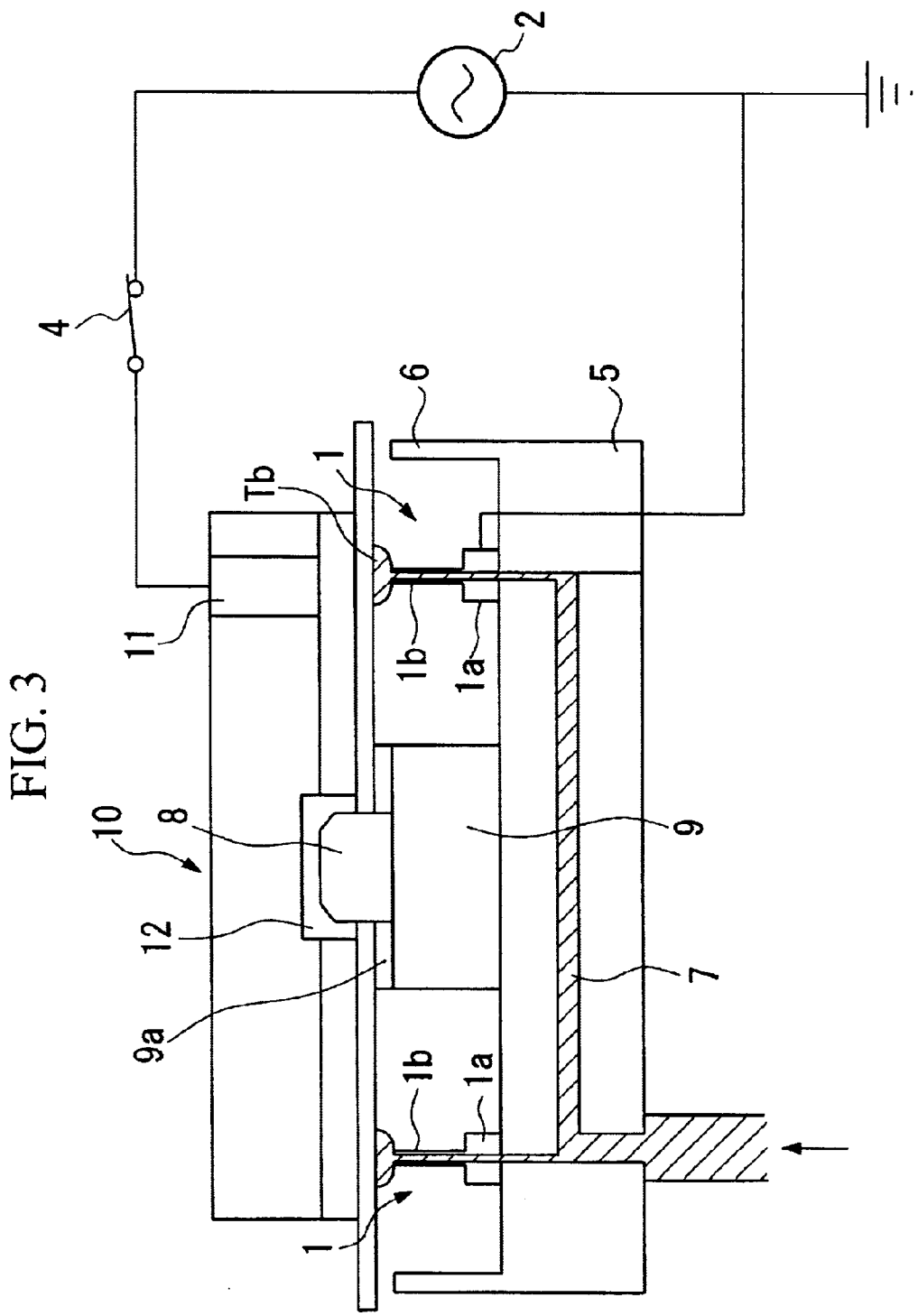
FIG. 3 is a cross-sectional view which illustrates an embodiment of the method and the apparatus for bonding optical disc substrates together according to the present invention.

In the case of forming the liquid films Tb, when the support means 10 holds the optical disc substrate A by suction at the different position from the position shown in FIG. 3, the support means 10 moves upper area of the illustration shown in FIG. 3 and then starts to move downward. By flipping the switch 4 ON during this process, the sinusoidal voltage from the alternating-current power supply 2 is applied to the whole adhesive-supplying nozzle 1 and the electrode portion 11 of the support means 10, and thereby an alternating-current electric field is generated between them. When the alternating-current electric field is generated, the optical disc substrate A is stopped about 0.4 to 2 mm above the tips of the adhesive-supplying nozzle 1, and the liquid adhesive from the adhesive-supplying nozzle is applied to the underside of the optical disc substrate A, as exemplified by the substrate denoted in FIG. 1B. Thereafter, the optical disc substrate A is brought upward and removed to proceed to the next step. Incidentally, as a safety measure, an elastic material 9*a* is fixed on the upper surface of the support 9 to prevent the optical disc substrate A from approaching the tips of the adhesive-supplying nozzle 1 and further extends to a point about 0.4 mm away from the tips. The upper surface of the elastic material 9*a* is about 0.4 mm above the tips of the adhesive-supplying nozzle 1. In other words, the elastic material 9*a* serves as a stopper.

When a liquid adhesive is applied from the adhesive-supplying nozzle 1 to the underside of the optical disc substrate A when the alternating-current electric field is generated described above, the intensity of the alternating-current electric field becomes relatively high because the spacing between the adhesive-supplying nozzle 1 and the electrode portion 11 of the support means 10 becomes very small. As a result, when viewed microscopically, immediately before application, the adhesive at the end of the adhesive-supplying nozzle 1 tapers off upward, and the contact area at the time of first making contact with the optical disc substrate A is sufficiently small. This is the reason why voids are rarely formed. As a result, an adhesive liquid film can be obtained having the pattern as denoted in FIG. 1B, in which substantially no voids are formed even by the method and apparatus presented in the present embodiment.

In the present embodiment as well, the amount of applied sinusoidal voltage cannot be generally determined because the amount of applied sinusoidal voltage depends on the ejection speed of the liquid adhesive, properties of the liquid adhesive such as resistivity and viscosity, the capacitance between the electrodes, and the like. However, a sinusoidal voltage having a peak value of its about 400 V or higher is required. In the present embodiment, a sinusoidal voltage having a peak value of about 900 V and a frequency of 4 kHz or higher, and in consideration of the audio-frequency range, a sinusoidal voltage of 20 kHz was used.

Figure 4:
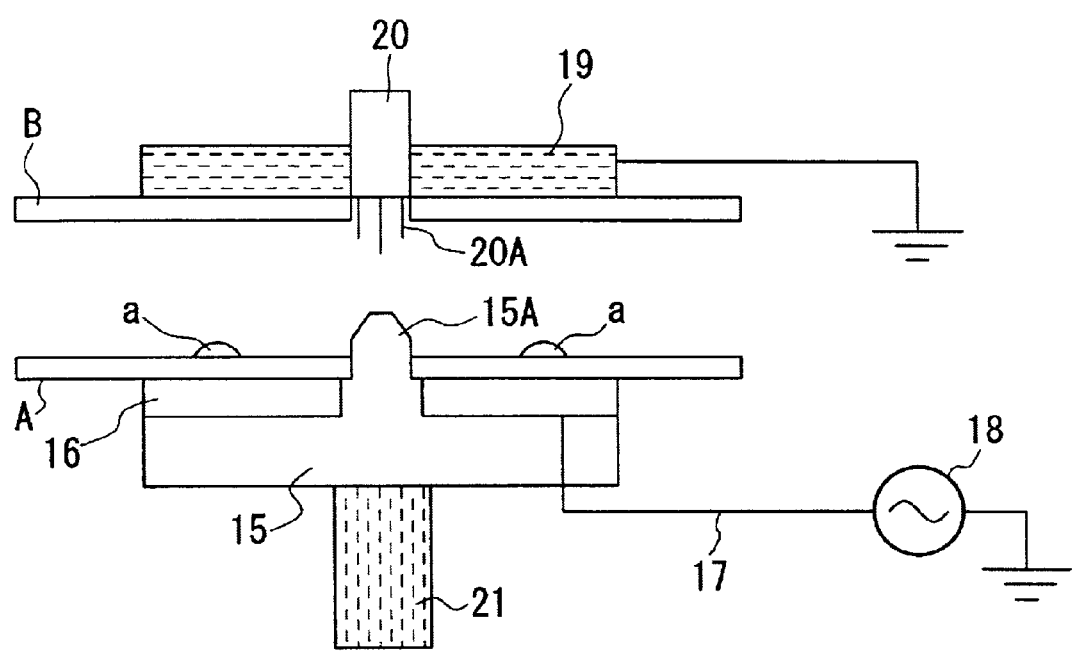
FIG. 4 is a cross-sectional view which illustrates an embodiment of the method and the apparatus for bonding optical disc substrates together according to the present invention.
Figure 5A:
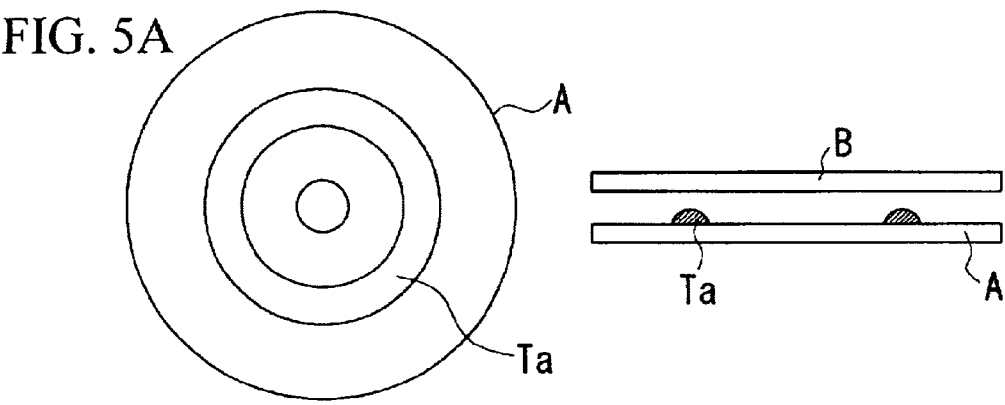
FIG. 5A is a front view and a side view of optical disc substrates which stepwise illustrates an embodiment for bonding optical disc substrates together according to the present invention.
Figure 5B:
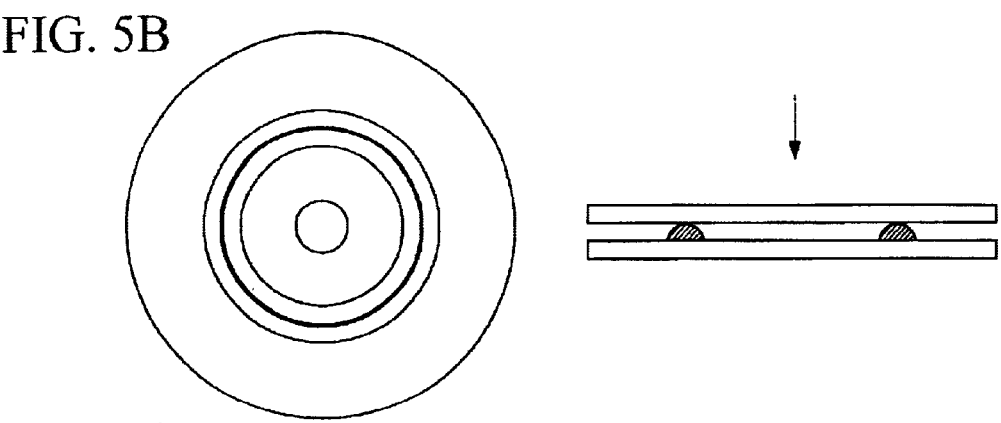
FIG. 5B is a front view and a side view of optical disc substrates which stepwise illustrates an embodiment for bonding optical disc substrates together according to the present invention.
Figure 5C:
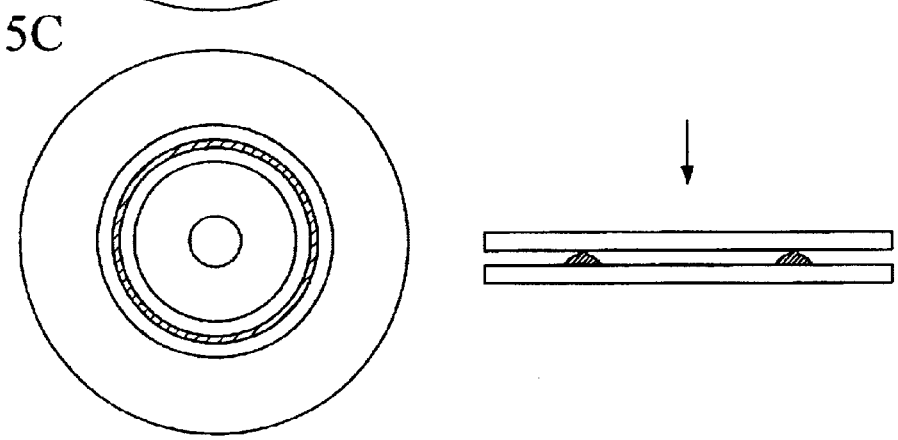
FIG. 5C is a front view and a side view of optical disc substrates which stepwise illustrates an embodiment for bonding optical disc substrates together according to the present invention.
Figure 5D:
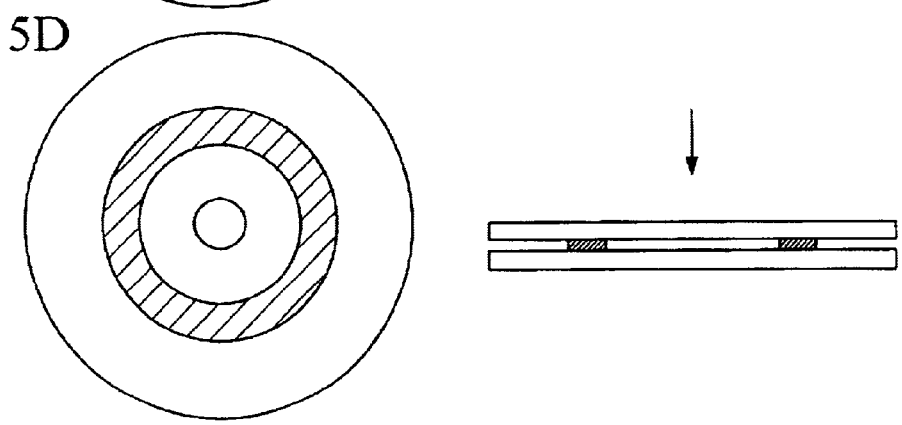
FIG. 5D is a front view and a side view of optical disc substrates which stepwise illustrates an embodiment for bonding optical disc substrates together according to the present invention.

Next, the bonding of the optical disc substrate A to the optical disc substrate B will be described with reference to FIGS. 1, 3, and 4 by considering the case where the optical disc substrate A is one having a ring-shaped adhesive liquid film as denoted in FIG. 1A, and the optical disc substrate B is one having no adhesive liquid film formed thereon as denoted in FIG. 1D The lower optical disc substrate A having the ring-shaped adhesive liquid film Ta as denoted in FIG. 1A is mounted on a support 15 of a bonding apparatus. The support 15 has a center axis 15A protruding at the center. The side wall of the center axis 15A is divided into a plurality of sections, through which chuck pawls, which will be described later, can pass. Further, the support 15 has a ring-shaped electrode portion 16 to which one of the terminals of an alternating-current power supply 18 is connected via a power supply wire 17. Meanwhile, the upper optical disc substrate B having no adhesive liquid film formed thereon is supported by a support means 19. The support means 19 is a disc-shaped member made of a conductive material such as stainless steel, which serves as one of the electrodes, and has a general suction mechanism (not shown) by which the support means 19 holds the upper surface of the upper optical disc substrate B by suction. Further, the support means 19 is connected to a transfer arm (not shown) that is horizontally spinnable at a certain angle and is electrically grounded through the transfer arm.

At the center of the support means 19, a chuck means 20 having an axis whose center is aligned with the center of the center axis 15A of the support 15 is fixed. The chuck means 20 has three chuck pawls 20A which can change the diameter of the chuck means 20 by an external signal. The chuck pawls 20A expand the diameter in the central holes of the optical disc substrates A and B in order to hold the inner walls of the optical disc substrates A and B when the optical disc substrates A and B are transferred to another position while maintaining the substrate B on the substrate A.

Figure 6:
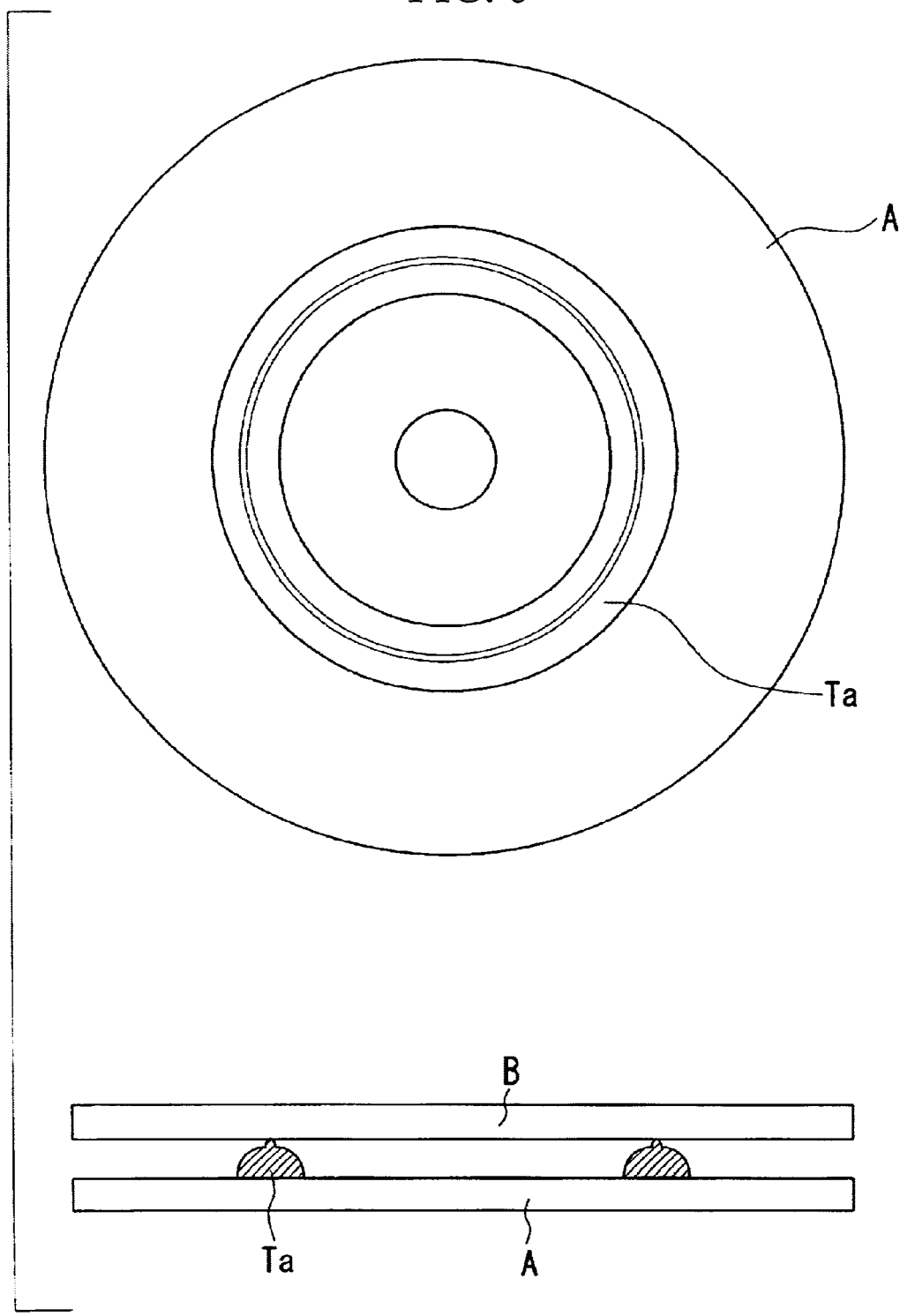
FIG. 6 is a front view and a side view of optical disc substrates which illustrate an embodiment for bonding optical disc substrates together according to the present invention.

The operation of this mechanism will be described with reference to FIGS. 5 and 6 in addition to the above FIGS. 1 to 4. The lower optical disc substrate A is mounted on the support 15, and in this state, the continuous ring-shaped liquid film Ta is formed on the upper surface of the optical disc substrate A as described in the above embodiment. Then, when the optical disc substrates A and B are opposite each other, a sinusoidal voltage is applied between the electrode portion 16 of the support 15 and the support means 19 by the alternating-current power supply 18 to generate an alternating-current electric field between the optical disc substrates A and B. Next, the support 15 is elevated by moving the lifting shaft 21 fixed on the underside of the support 15 upward by means of a driving mechanism (not shown) such as a cylinder device, whereby the spacing between the optical disc substrates A and B becomes smaller as denoted in FIG. 5A and the top of the liquid film Ta eventually makes contact with the underside of the optical disc substrate B as denoted in FIG. 5B. During this approaching process of the liquid film Ta, since the intensity of the electric field between the optical disc substrates A and B becomes stronger as the spacing between them becomes smaller, the top of the liquid film Ta tapers off upward by suction force caused by the electric field, and the tapered top of the liquid film Ta makes contact with the underside of the optical disc substrate B first. Therefore, the area of the top of the liquid film Ta at the moment when the liquid film Ta makes contact with the optical disc substrate B becomes significantly smaller than that of the prior art. The initial state of the contact is magnified and shown in FIG. 6. The liquid film Ta which makes contact with the optical disc substrate B spreads not only in the circumferential direction but also in the radial direction between the optical disc substrates A and B to form a circle as denoted in FIGS. 5C and 5D.

Next, the chuck means 20 is operated by the external signal, and the chuck pawls 20A move to expand the diameter of the chuck means 20 in the central holes of the optical disc substrates A and B so as to hold the inner walls of the optical disc substrates A and B. With this state maintained, the support 15 is brought down by moving the lifting shaft 21 downward, and the optical disc substrates A and B are held by the chuck means 20 and supported by the support means 19. In reality, the adhesive liquid film between the optical disc substrates A and B in this state spreads out much more widely than shown in FIG. 5, and minute voids or larger voids are not observed when the liquid film is observed through the optical disc substrates A and B. Thereafter, the support means 19 is spun by a spinning means (not shown) and transfers the optical disc substrates A and B to a spinner (not shown).

That is, in the present embodiment, since an electric field is generated when the liquid adhesive is supplied onto the optical disc substrate A or when the optical disc substrates A and B are bonded together, the adhesive can make contact with the optical disc substrate B in a very preferable condition, and the formation of voids between the optical disc substrates A and B bonded together can be significantly inhibited.

When the optical disc substrates A and B are bonded together, it is difficult to make them sufficiently parallel to each other across the whole surface, and it is also extremely difficult to make the thickness of the adhesive liquid film Ta uniform. Therefore, when the adhesive liquid film Ta is observed microscopically at the time of contacting with the optical disc substrate B, the adhesive condition of the adhesive liquid film Ta is not actually uniform. Therefore, when a direct-current voltage is applied, the first portion of the liquid film which makes contact is wetted due to the effect of applying the voltage but the second and later portions of the liquid film which make contact are not wetted as well as the first portion. This is because the positive and negative electric charges induced between the optical disc substrates A and B through the resistance R (to be described later) of the adhesive start to neutralize from the moment when the first portion of the liquid film makes contact, whereby the voltage between the optical disc substrates A and B decreases and the effect of applying the voltage is therefore weakened to some extent. Thus, the sinusoidal voltage was applied in the present embodiment.

Figure 7:
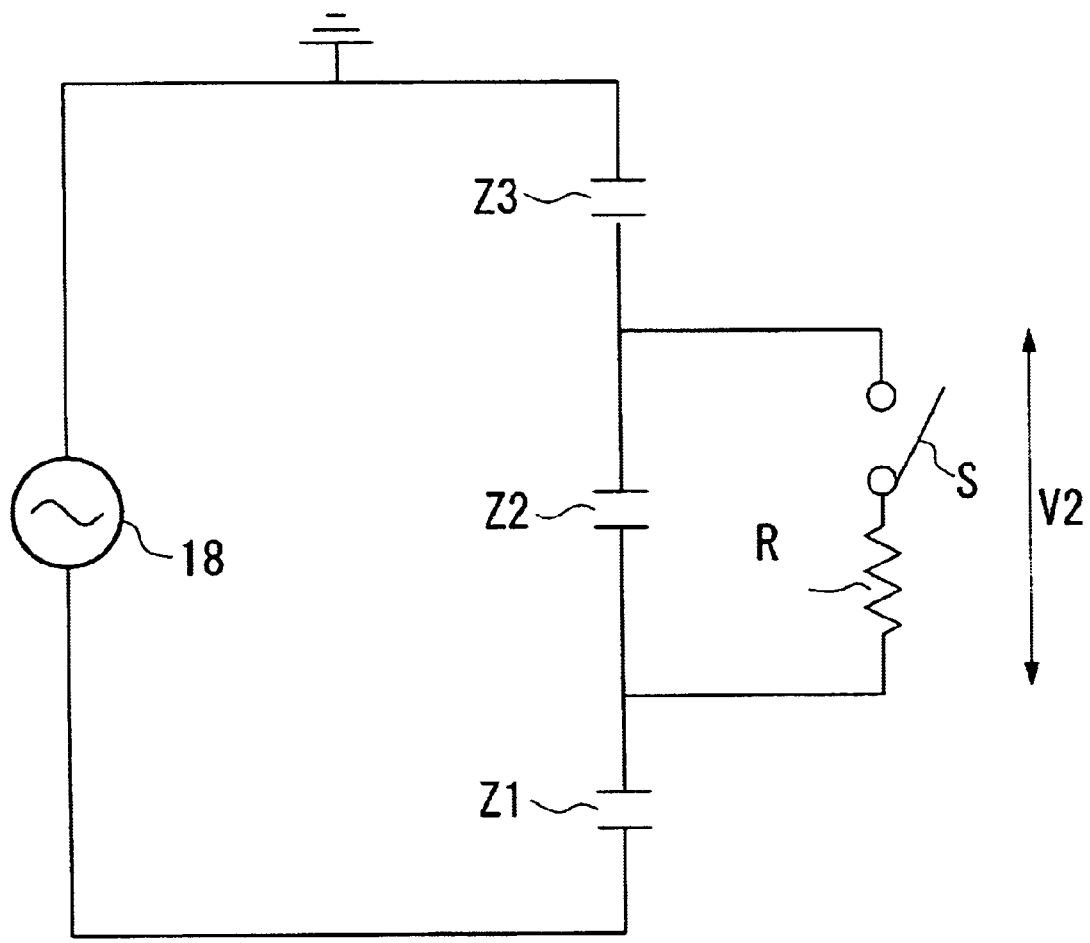
FIG. 7 is a circuit diagram which illustrates an embodiment for bonding of optical disc substrates together according to the present invention.
Figure 8:
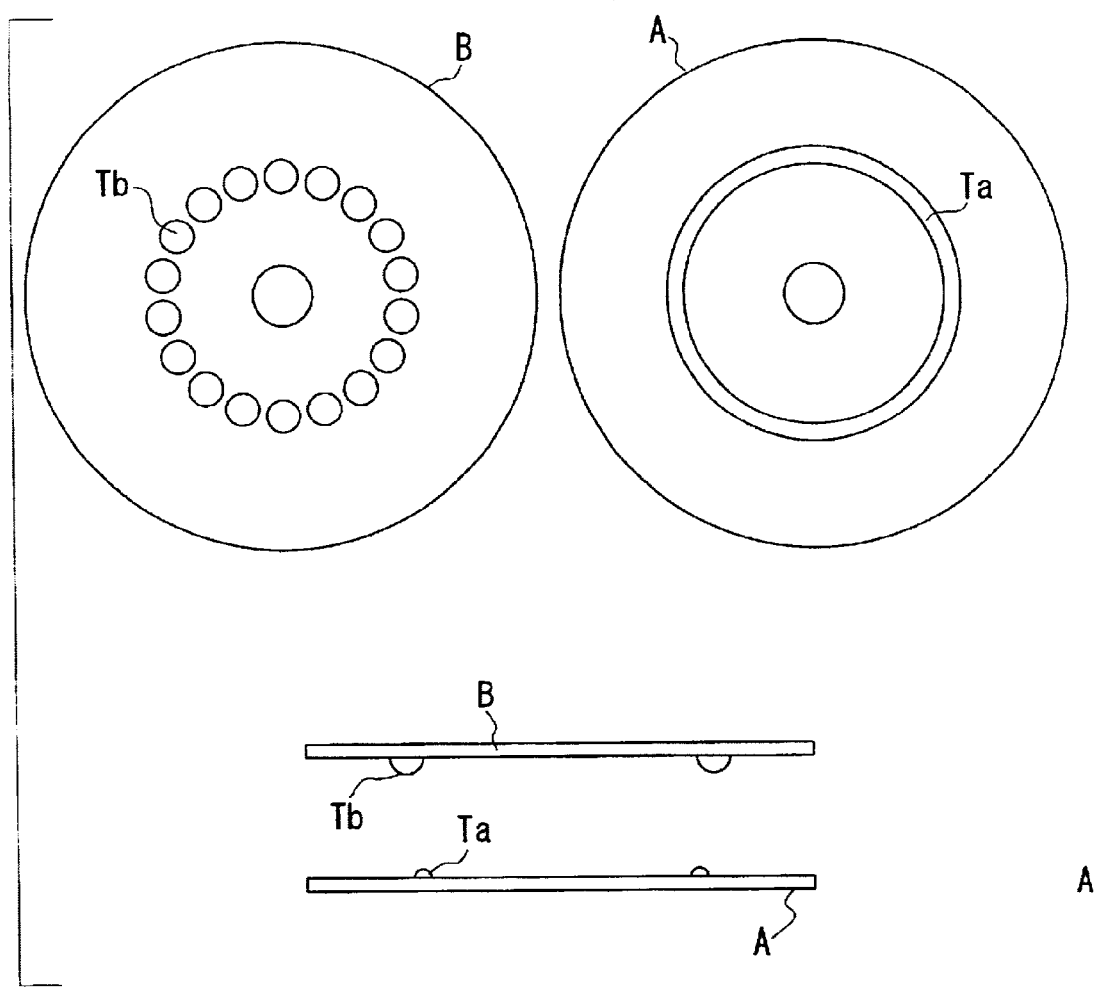
FIG. 8 is a front view and a sectional view of optical disc substrates which illustrates a conventional method for bonding optical disc substrates together.

When the sinusoidal voltage is applied, the electrode portion 16 of the support 15, the reflective film (not shown) of the optical disc substrate A and the insulating material of the optical disc substrate A form a first capacitance and exhibit an impedance Z1 as shown in FIG. 7. The gap between the reflective film of the optical disc substrate A and the reflective film (not shown) of the optical disc substrate B forms a second capacitance and exhibits an impedance Z2 as shown in FIG. 7. Further, the reflective film of the optical disc substrate B, the support means 19 and the insulating material of the optical disc substrate B interposed between them form a third capacitance and exhibit an impedance Z3 as shown in FIG. 7. Furthermore, in FIG. 7, the gap between the reflective film of the optical disc substrate A and the reflective film of the optical disc substrate B is denoted by a switch S and the resistance of the adhesive is denoted by R; these are connected in parallel to the impedance Z2.

Since all of the impedances Z1 to Z3 tend to become small in response to an increase in the frequency f of a voltage to be applied (for example, $Z1=1/2\pi fC3$ and $Z3=1/2\pi fC1$, on the proviso that Z1 and Z3 are absolute values), the impedances Z1 to Z3 can be made small by applying a sinusoidal voltage having an appropriate frequency between the optical disc substrates A and B. Therefore, when the frequency f is determined such that the values of the impedances Z1 to Z3 are to be equal to or less than the resistance R of the adhesive, the voltage V2 between the reflective film of the optical disc substrate A and the reflective film of the optical disc substrate B is hardly affected by the resistance R.

That is, when the sinusoidal voltage is applied between the optical disc substrates A and B, by setting the frequency f of the sinusoidal voltage properly, the voltage V2 between the reflective film of the optical disc substrate A and the reflective film of the optical disc substrate B hardly decreases even when the adhesive liquid film Ta makes contact with the optical disc substrate B. This indicates that the effect of applying the voltage is still maintained even when a plurality of different portions of the adhesive liquid film Ta make contact at different times.

In this case, when conditions such as the thicknesses of the optical disc substrates A and B, the dielectric constants and the resistivity of the adhesive are taken into consideration, the effect of applying the voltage is large when the frequency f of the sinusoidal voltage to be applied is 50 Hz or higher.

According to the present embodiment, since the top of the liquid film Ta is tapered by the alternating-current electric field and the adhesive makes contact with the optical disc substrate B at the top, the occurrence of minute voids which are likely to be formed at the time of bonding is sufficiently inhibited. Further, since the liquid film Ta quickly spreads out not only in the circumferential direction but also in the radial direction between the optical disc substrates A and B whose surfaces are charged with positive and negative electric charges, no air is trapped therebetween in this process. Therefore, voids which are larger in diameter than the minute voids are also not formed in the adhesive layer which has been spread out thinly and uniformly between the optical disc substrates A and B by the spinning process. Further, when the voltage to be applied is a sinusoidal voltage, voltage must be applied based on the mean value of the sinusoidal voltage since the absolute mean value affects the effect the voltage application. Further, the waveform of the sinusoidal voltage is not limited to a sinusoidal wave and can be a positive and negative alternating waveform such as a rectangular wave, a trigonal wave or a sinusoidal wave having periods when the voltage is not applied.

Figure 1D:
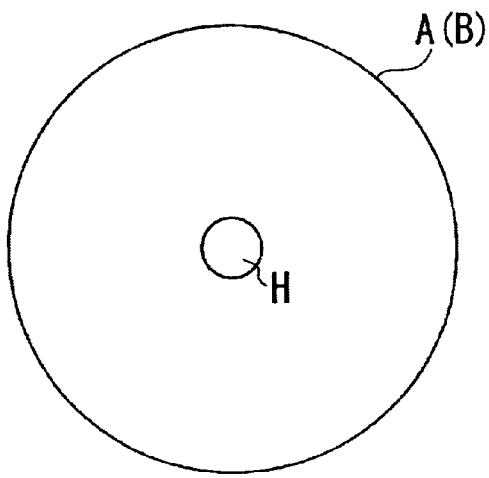
FIG. 1D is a front view of optical disc substrate which illustrates an embodiment of the method for bonding optical disc substrates of the present invention.

Further, when the substrates denoted in FIG. 1A are bonded together, when the substrate denoted in FIGS. 1A, 1C or 1D are bonded together, or even when the substrate denoted in FIG. 1B and the substrate denoted in FIGS. 1A, 1C or 1D are bonded together, the present invention can be applied to these cases exactly in the same manner as in the present embodiment, and the same effect can be obtained. Thus, descriptions therefor will be omitted.

Further, the present invention can be applied not only to the case where optical disc substrates are flat but also to the case where optical disc substrates having a curved surface, such as lenses, are bonded together, and the same effect can be obtained. Further, although the case where a single adhesive-supplying nozzle is used has been described in the embodiment shown in FIG. 2, two adhesive-supplying nozzles can be used which are separated from each other by 180 degrees and supply adhesives on the optical disc substrate simultaneously while the optical disc substrate is rotated about a half turn. Further, instead of the optical disc substrate, the adhesive-supplying nozzle(s) can be rotated at a fixed speed. Still further, there is also a case where the same effect can be obtained by applying a direct-current voltage. Incidentally, the switch 4 is shown in FIGS. 2 and 3 for illustrating the ON and OFF states of the sinusoidal voltage and is substituted with the switching element of the primary circuit of the alternating-current power supply in an actual apparatus.

Although the supplying of the adhesive in the process of bonding optical disc substrates together has been described in the above embodiment, similarly, it is common practice in the production of compact disc (CD) that a liquid material is supplied onto a disc in the shape of a ring, and the disc is then spun at a high speed to form a protective film or recording film having less bubbles. It has been confirmed that exactly the same effect as obtained in the case of the above adhesive can be obtained when the present invention is applied to the production of compact disc. That is, just as is shown in FIG. 2, when a liquid material capable of forming a ring-shaped protective or recording film is supplied onto a CD substrate, a voltage is applied between a supply nozzle for supplying the liquid material and the CD substrate, whereby the wettability between the liquid material and the CD substrate improves, resulting in that voids which are likely to be formed between the liquid material and the CD substrate can be almost eliminated. This can also be applied to the case where a liquid material for forming a protective film or a resist film is supplied as dots around the center of the surface of a polygonal or circular glass plate, a semiconductor wafer, or a plate-shaped object as a lens has a curved surface.

Further, even when the liquid material supplied, as described above, is not sandwiched between the substrates but is spread out in a substantially uniform thickness by using a spin-coating device such as a general spin coater, a coating film of high quality having few voids can be obtained by applying the present invention. This case will be described in more detail. When a liquid material is supplied from the supply nozzle by a voltage applied between the nozzle and the CD substrate as described above and an excess of the liquid material is then spun off from the substrate by high-speed spinning to form a coating film having a desired thickness at the position of coating the film or another position, a support stage (not shown), spinning at a high speed with the CD substrate thereon, is provide acting as a lower electrode, an upper electrode plate is placed above the CD substrate, and the above-described sinusoidal voltage is applied to the electrodes, whereby the wettability to the liquid material of the CD substrate improves, resulting in a great reduction in the number of voids which are likely to be generated between the liquid material and the CD substrate. Note that the voltage can be applied in the same manner as in the above embodiment.

What is claimed is:

1. A method for bonding two optical disc substrates which comprises steps of:

supplying adhesive onto at least one of said optical disc substrates by an adhesive-supplying nozzle, forming an electric field between said adhesive-supplying nozzle and said optical disc substrate while supplying said adhesive onto said optical disc substrate;

joining said optical disc substrates with the adhesive;

spinning the joined optical disc substrates, and curing said adhesive.

2. A method for bonding two optical disc substrates which comprises steps of:
supplying adhesive onto only one of said optical disc substrates in a ring shape,
joining said optical disc substrates with said adhesive while forming an electric field between said optical disc substrates;
spinning the joined optical disc substrates, and
curing said adhesive.

3. A method for bonding two optical disc substrates which comprises steps of:
supplying adhesive onto one of said optical disc substrates in a ring shape and onto the other of said optical disc substrates so as to cover most of a surface thereof,
joining said optical disc substrates with said adhesive while forming an electric field between said optical disc substrates;
spinning the joined optical disc substrates, and
curing said adhesive.

4. A method for bonding two optical disc substrates which comprises steps of:
supplying adhesive onto one of said optical disc substrates in a ring shape and onto the other of said optical disc substrates in a circular shape by dots at a relatively small spacing,
joining said optical disc substrates with said adhesive while forming an electric field between said optical disc substrates;
spinning the joined optical disc substrates, and
curing said adhesive.

5. A method for bonding two optical disc substrates which comprises steps of:
supplying adhesive onto only one of said optical disc substrates in a circular shape by dots at a relatively small spacing,
joining said optical disc substrates with said adhesive while forming an electric field between said optical disc substrates;
spinning the joined optical disc substrates, and
curing said adhesive.

6. A method for bonding two optical disc substrates which comprises steps of:
supplying adhesive onto one of said optical disc substrates in a circular shape by dots at a relatively small spacing and onto the other of said optical disc substrates so as to cover most of a surface thereof,
joining said optical disc substrates with said adhesive while forming an electric field between said optical disc substrates;
spinning the joined optical disc substrates, and
curing said adhesive.

7. The method according to claim 1, wherein the electric field is an alternating-current electric field.

8. The method according to claim 2, wherein the electric field is an alternating-current electric field.

9. The method according to claim 3, wherein the electric field is an alternating-current electric field.

10. The method according to claim 4, wherein the electric field is an alternating-current electric field.

11. The method according to claim 5, wherein the electric field is an alternating-current electric field.

12. The method according to claim 6, wherein the electric field is an alternating-current electric field.

13. The method according to claim 1, wherein the electric field is an direct-current electric field.

14. The method according to claim 2, wherein the electric field is an direct-current electric field.

15. The method according to claim 3, wherein the electric field is an direct-current electric field.

16. The method according to claim 4, wherein the electric field is an direct-current electric field.

17. The method according to claim 5, wherein the electric field is an direct-current electric field.

18. The method according to claim 6, wherein the electric field is an direct-current electric field.

19. A method for supplying a liquid material onto an optical disc substrate which comprises steps of:
supplying said liquid material onto a surface of said optical disc substrate by a liquid material-supplying nozzle,
forming an electric field between said liquid material-supplying nozzle and said optical disc substrate while supplying said liquid material onto said optical disc substrate so as to taper an end of said liquid material toward said surface in order to reduce an initial contact area between said liquid material and said surface for preventing generation of voids in said liquid material, and
spinning said optical disc substrate.

20. A method for supplying a liquid material from a liquid material-supplying means onto a surface of a polygonal or circular glass plate, a semiconductor wafer, a plate-shaped object, or a lens having a curved surface, comprising steps of:
supplying said liquid material onto said surface by said liquid material-supplying means, and
applying a voltage to said liquid material-supplying means while supplying said liquid material onto said surface, so as to taper an end of said liquid material toward said surface in order to reduce an initial contact area between said liquid material and said surface for preventing generation of voids in said liquid material.

21. The method according to claim 19, wherein the electric field is an alternating-current electric field.

22. The method according to claim 19, wherein the electric field is an direct-current electric field.

23. A method for forming an optical disc comprising steps of:
supplying an adhesive onto one of two optical disc substrates,
setting said optical disc substrates so as to face a liquid film of said adhesive which was supplied onto one of said optical substrates toward the other of said optical disc substrates;
forming an electric field between said optical disc substrates so as to taper a surface of said liquid film toward the other of said optical disc substrates in order to reduce an initial contact area between said surface of said liquid film and the other of said optical disc substrates for preventing generation of voids in said liquid film, and
joining said optical disc substrates with said adhesive while forming said electric field between said optical disc substrates.

24. A method for forming an optical disc comprising steps of:
supplying an adhesive onto one of two optical disc substrates, respectively,
setting said optical disc substrates so as to face a liquid film of said adhesive which was supplied onto one of said optical substrates;
forming an electric field between said optical disc substrates so as to taper a surface of said liquid film which was supplied onto one of said optical disc substrates toward said liquid film which was supplied onto the other of said optical disc substrates in order to reduce an initial contact area between said liquid films for preventing generation of voids in said liquid films, and joining said optical disc substrates with said adhesive while forming said electric field between said optical disc substrates.

* * * * *